(12) United States Patent
Shirakawa et al.

(10) Patent No.: US 9,128,171 B2
(45) Date of Patent: Sep. 8, 2015

(54) SYSTEM AND METHOD FOR DETECTION AND RANGING

(75) Inventors: Kazuo Shirakawa, Yokohama (JP); Yoji Ohashi, Fucyu (JP)

(73) Assignee: FUJITSU LIMITED, Kawasaki (JP)

( * ) Notice: Subject to any disclaimer, the term of this patent is extended or adjusted under 35 U.S.C. 154(b) by 522 days.

(21) Appl. No.: 13/564,412

(22) Filed: Aug. 1, 2012

(65) Prior Publication Data

US 2013/0069818 A1 Mar. 21, 2013

(30) Foreign Application Priority Data

Sep. 20, 2011 (JP) ................................. 2011-205314

(51) Int. Cl.
*G01S 7/03* (2006.01)
*G01S 13/34* (2006.01)
*G01S 13/38* (2006.01)
*G01S 13/93* (2006.01)

(52) U.S. Cl.
CPC ................ *G01S 7/032* (2013.01); *G01S 13/347* (2013.01); *G01S 13/38* (2013.01); *G01S 13/931* (2013.01)

(58) Field of Classification Search
CPC ........... G01S 7/35; G01S 7/352; G01S 7/032; G01S 2013/9314–2013/9396; G01S 13/931; G01S 13/38; G01S 13/347
USPC ..................................................... 342/70–72
See application file for complete search history.

(56) References Cited

U.S. PATENT DOCUMENTS 6,684,696 B2   2/2004  Schultheiss
6,747,592 B2 *  6/2004  Nakamura ...................... 342/70
7,151,482 B2 * 12/2006  Natsume et al. .............. 342/147
7,460,052 B2  12/2008  Zemany et al.
7,817,082 B2  10/2010  Dwelly et al.
7,859,450 B2  12/2010  Shirakawa
8,009,083 B2   8/2011  Shirakawa (Continued)

FOREIGN PATENT DOCUMENTS

CN       101021561 A    8/2007
EP       2045612 A2     4/2009

(Continued)

OTHER PUBLICATIONS

Jankiraman, M. et al. "Pandora Multifrequency FMCW/SFCW Radar," IEEE International Radar Conference, pp. 750-757, May 7-12, 2000, XP001175458.

(Continued)

*Primary Examiner* — Matthew M Barker
(74) *Attorney, Agent, or Firm* — Fujitsu Patent Center

(57) ABSTRACT

A detection and ranging system includes: a signal generator configured to generate M probe signals having different carrier frequencies; M transmitting elements configured to transmit the M probe signals; N receiving elements configured to receive an echo signal from a target; N demodulators provided for the N receiving elements, each of the demodulators being configured to generate a demodulated echo signal by demodulating an echo signal received by a corresponding one of the receiving elements by using at least one of the M probe signals, and to generate M sets of data signals corresponding to the M probe signals by filtering the demodulated echo signal in a frequency domain; and a signal processor configured to detect the target according to M×N sets of data signals generated by the N demodulators.

10 Claims, 12 Drawing Sheets

(56) References Cited

U.S. PATENT DOCUMENTS

| | | | |
|---|---|---|---|
| 8,077,076 B2* | 12/2011 | Walter et al. | 342/70 |
| 2012/0235857 A1* | 9/2012 | Kim et al. | 342/134 |

FOREIGN PATENT DOCUMENTS

| | | | |
|---|---|---|---|
| JP | 2009-080024 A | 4/2009 | |
| JP | 2010-145289 A | 7/2010 | |
| JP | 2010-243237 A | 10/2010 | |

OTHER PUBLICATIONS

Skolnik, Merrill I., "Chapter three: CW and Frequency-Modulated Radar," Introduction to Radar Systems, Jan. 1, 1981, pp. 68-100, XP055047545.

Extended European Search Report dated Dec. 19, 2012 for corresponding European Application No. 12178883.0.

JPOA—Office Action of Japanese Patent Application No. 2011-205314 dated Mar. 3, 2015, with English translation of the relevant part.

* cited by examiner

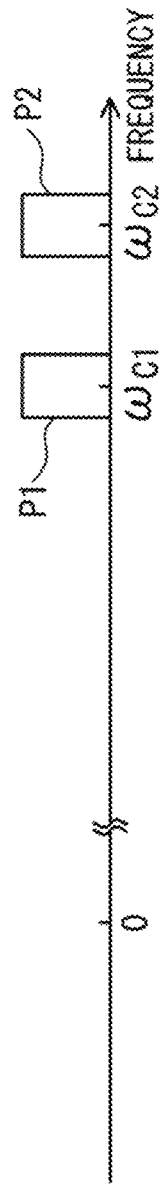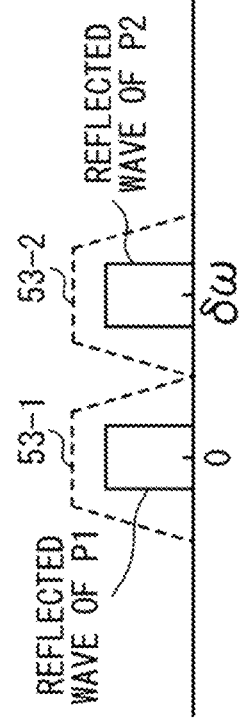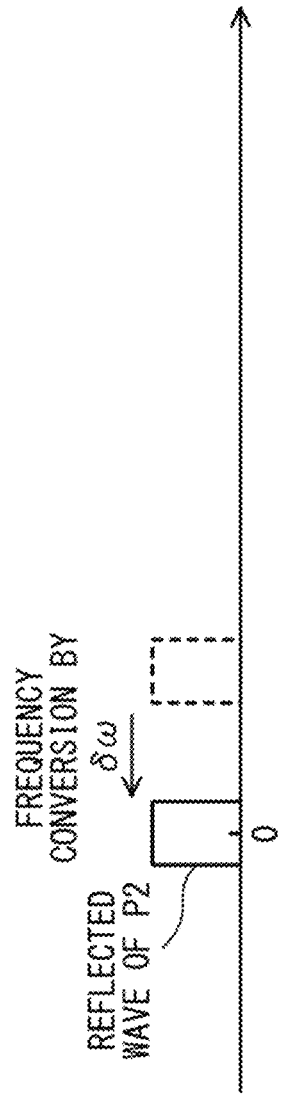

F I G. 1 1 A
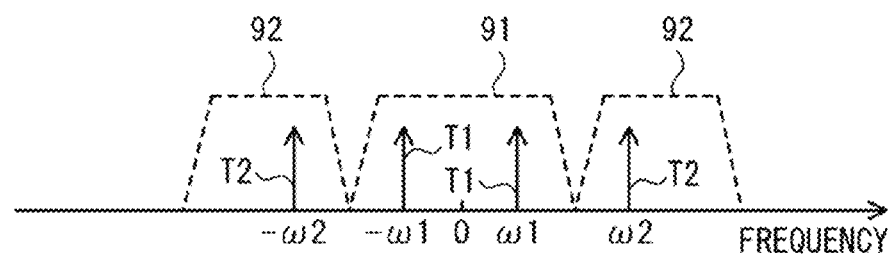
F I G. 1 1 B
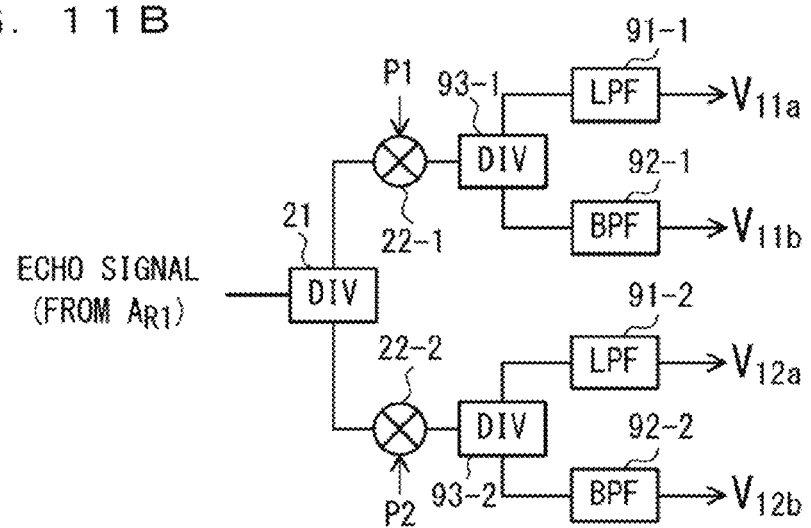

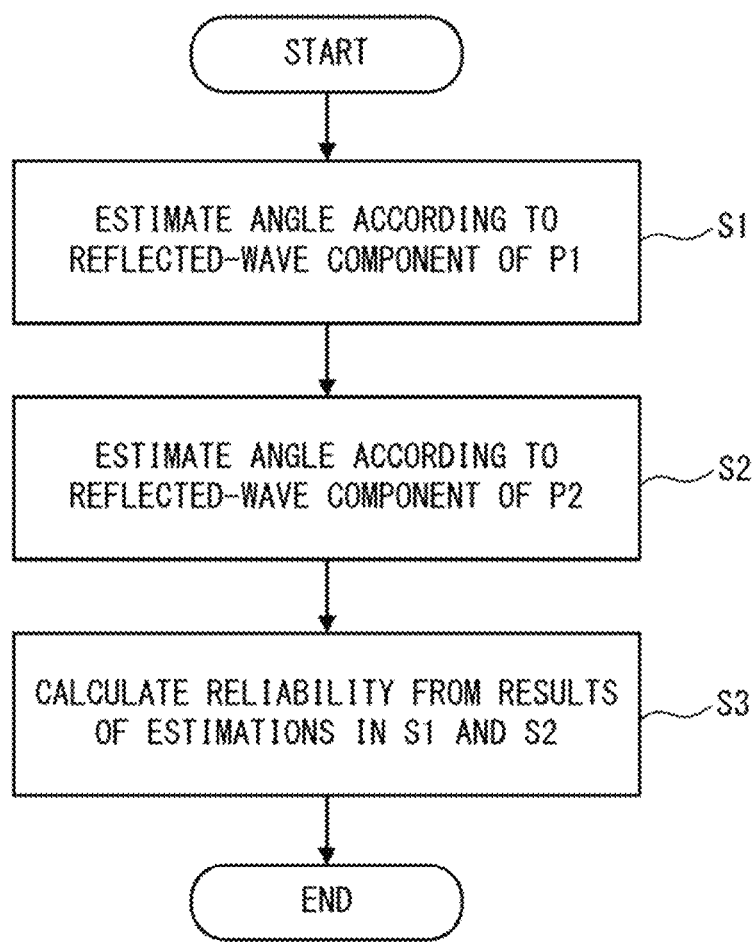
F I G. 1 2

SYSTEM AND METHOD FOR DETECTION AND RANGING

CROSS-REFERENCE TO RELATED APPLICATION

This application is based upon and claims the benefit of priority of the prior Japanese Patent Application No. 2011-205314, filed on Sep. 20, 2011, the entire contents of which are incorporated herein by reference.

FIELD

The embodiments described herein are related to a system and a method for detection and ranging of a target object.

BACKGROUND

Conventionally, detection and ranging systems that detect a target using radio waves (e.g., millimeter waves) have been put into practical use. The detection and ranging systems radiate a probe signal to a detection region and receive a reflected signal (i.e., an echo signal) from a target. By analyzing the received echo signal, the detection and ranging systems estimate a line-of-sight direction relative distance to the target (hereinafter simply referred to as "distance"), a line-of-sight direction relative speed of the target (hereinafter simply referred to as "speed"), and the direction to (or angle formed with) the target. Such detection and ranging systems include, for example, a plurality of receiving sensor elements arranged at equal spacing and, in accordance with, for example, the phase of an echo signal received by each receiving sensor element, estimates of various factors (such as distance, speed, and angle) for detecting the target.

In regard to the aforementioned detection and ranging systems, increasing the number of receiving sensor elements to enlarge an aperture of the receiving sensor array will increase the number of detectable targets, further enhancing, for example, the performance of angle estimation as well. Meanwhile, in the case of, in particular, a detection and ranging system installed in a vehicle or the like, the system needs to be downsized and the cost needs to be reduced.

In terms of downsizing of a system, a technology has been proposed wherein a configuration including a plurality of transmitting sensor elements and a plurality of receiving sensor elements is employed and an effective aperture of the receiving sensor array is widened by properly switching the sensors with a time sharing scheme. In this technology, however, for each time slot occupied by an individual transmitting sensor element, an echo signal vector needs to be obtained using the receiving sensor array, and the phase of a signal vector obtained at each time slot needs to be matched, requiring a long time to detect a target.

To solve this problem, the following detection and ranging method has been proposed. That is, probe signals spread at a plurality of modulators by using mutually orthogonal codes are radiated simultaneously (simultaneity is defined by, at least, defining the operation cycle of the system as a unit time; however, a plurality of unit times may be combined as a new unit time; this is also true for the following descriptions) from a plurality of transmitting sensor elements. Signals received by a plurality of receiving sensors are respectively split by a plurality of splitters, and the resultant signals are de-spread in demodulators using the same code as that used on the transmitter side. (e.g., Japanese Laid-open Patent Publication No. 2009-80024)

As other related arts, Japanese Laid-open Patent Publication No. 2010-243237 and Japanese Laid-open Patent Publication No. 2010-145289 are known.

A detection and ranging system employing a scheme of spreading a transmission wave by using a code is preferable in the sense that the system shortens the time required to detect a target. However, this kind of system needs, for example, a circuit for synchronous detection of a spread code, and hence the circuit size becomes large, increasing the production cost.

SUMMARY

According to one aspect of the embodiments, a detection and ranging system includes: a signal generator configured to generate M probe signals having different carrier frequencies; M transmitting elements configured to transmit the M probe signals; N receiving elements configured to receive an echo signal from a target; N demodulators provided for the N receiving elements, each of the demodulators being configured to generate a demodulated echo signal by demodulating an echo signal received by a corresponding one of the receiving elements by using at least one of the M probe signals, and to generate M sets of data signals corresponding to the M probe signals by filtering the demodulated echo signal in a frequency domain; and a signal processor configured to detect the target according to M×N sets of data signals generated by the N demodulators. M is an integer larger than or equal to two. N is an integer larger than or equal to two.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6A to FIG. 6C illustrate operations of a demodulator in accordance with the second embodiment.

FIG. 11A and FIG. 11B illustrate exemplary operations of a sixth embodiment.

FIG. 12 is a flowchart indicating a process of calculating the reliability of angle estimation.

DESCRIPTION OF EMBODIMENTS

A detection and ranging system in accordance with embodiments of the present invention includes a plurality of transmitting elements (or transmitting sensor elements) and a plurality of receiving elements (or receiving sensor elements). Each of the transmitting sensor elements radiates a probe signal to a detection region. When there is a target (or a object to be detected) within the detection region, the probe signal is reflected from the target. Each of the receiving sensor elements receives the reflected signal (i.e., echo signal) from the target. By analyzing, for example, the phase of the received echo signal, the detection and ranging system estimates the distance from the detection and ranging system to the target, the speed of the target relative to the detection and ranging system, and the direction (angle) to the target.

In the following embodiments, a radar will be described as an example of the detection and ranging system, and hence the transmitting sensor element is a transmitting antenna and the receiving sensor element is a receiving antenna.

First Embodiment

Figure 1:
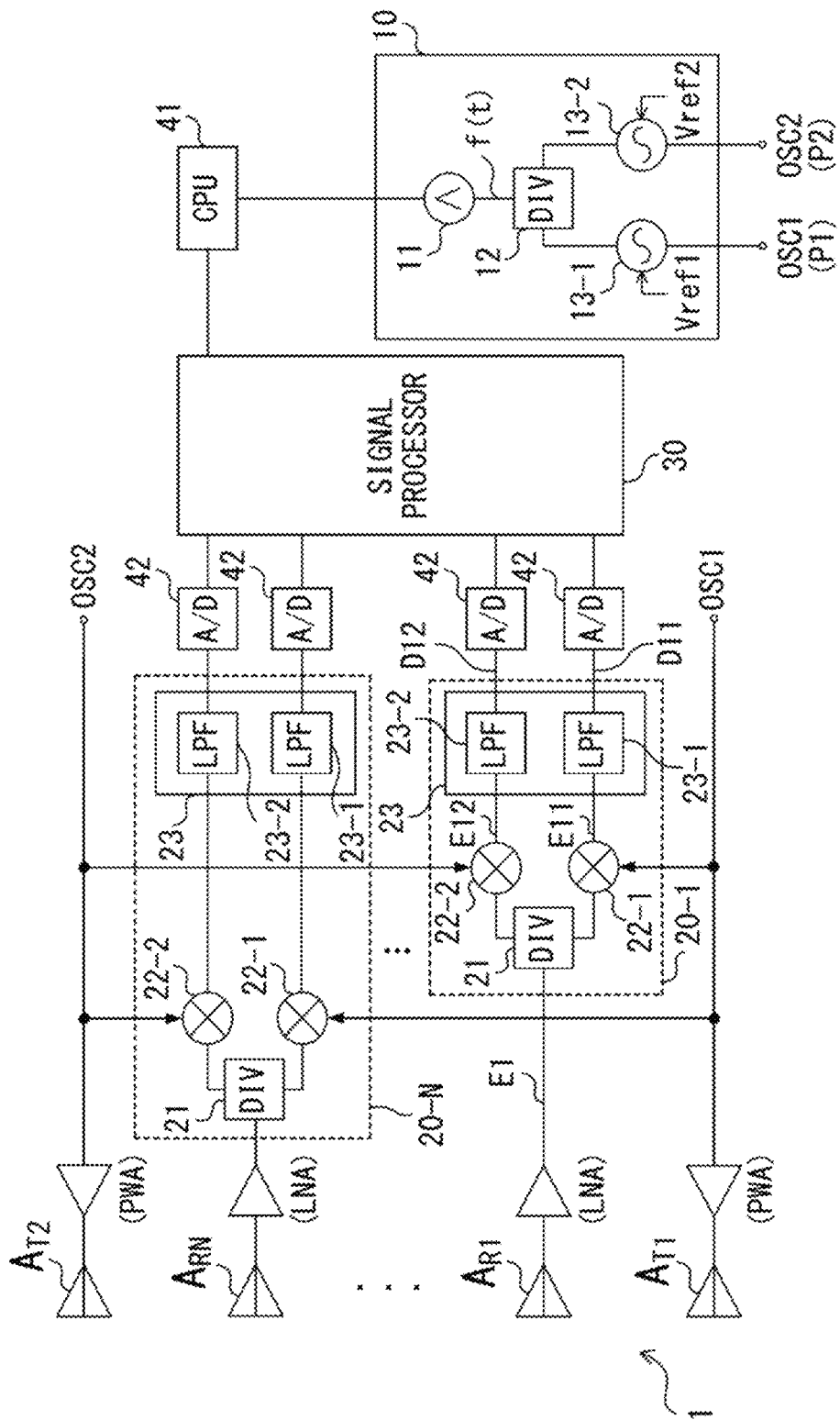
FIG. 1 illustrates the configuration of a detection and ranging system in accordance with a first embodiment.

FIG. 1 illustrates the configuration of a detection and ranging system (hereinafter referred to as a "detection and ranging system 1") in accordance with a first embodiment. The detection and ranging system 1 includes a signal generator 10, transmitting antennas $A_{T1}$ to $A_{T2}$ (i.e., M=2), receiving antennas $A_{R1}$ to $A_{RN}$, demodulators 20-1 to 20-N, a signal processor 30, and a CPU 41. To simplify descriptions of operations of the system, assume that the CPU 41 addresses controlling of the operation of the detection and ranging system 1 and the signal processor 30 addresses a detection and ranging process, and operations of the CPU 41 will not be described.

The signal generator 10 includes a modulation input signal generator (BB-OSC: base band oscillator) 11, a divider 12, and a plurality of high-frequency RF voltage controlled oscillators (or RF-VCOs: radio frequency voltage-controlled oscillators) 13-1 and 13-2 each of which oscillates at a different center frequency (or carrier frequency). That is, the signal generator 10 generates a plurality of probe signals with different carrier frequencies which have been modulated by an input signal from the BB-OSC.

The BB-OSC 11 generates a modulation input signal f(t). In this example, f(t) is assumed to be a cyclic voltage signal illustrated in FIG. 2 (the signal may assume another waveform). The illustrated f(t) includes, for each cycle Tm, an up-chirp section in which the voltage increases linearly with respect to time and a down-chirp section in which the voltage decreases linearly with respect to time. A specific values of the cycle Tm and voltage range of f(t) may be determined in mainly accordance with the resolutions of the distance and the speed, and the value is, for example, about several tens of milliseconds. The range of values of voltages does not need to be monopolar but may be bipolar.

f(t) generated by the BB-OSC 11 is divided by the divider (DIV) 12 and used as a control signal that controls an oscillation frequency of the RF-VCOs 13-1 and 13-2. Each of the RF-VCOs includes at least one terminal with which the control signal can be input (or control signal input terminal).

The RF-VCOs 13-1 and 13-2 oscillate at a frequency corresponding to a voltage (or a current) applied to a control terminal. In the description, "frequency" and "angular frequency" are not distinguished and both are referred to as "frequency". That is, "frequency" includes an angular frequency.

A modulation input signal f(t) and a reference voltage Vref1 for setting a carrier frequency $\omega_{c1}$ are superimposed and applied to a control terminal of the RF-VCO 13-1. Thus, an instantaneous frequency of the RF-VCO is centered around $\omega_{c1}$ and changed by f(t). A frequency modulation oscillator configured in this way is referred to as an OSC1, and a probe signal output from the OSC1 is referred to as P1.

Similarly, the modulation input signal f(t) and a reference voltage Vref2 for setting a carrier frequency $\omega_{c2}$ are superimposed and applied to a control terminal of the RF-VCO 13-2. Thus, the instantaneous frequency of the RF-VCO is centered around $\omega_{c2}$ and changed by f(t). A frequency modulation oscillator configured as described above is referred to as an OSC2, and a probe signal output from the OSC2 is referred to as P2.

Note that by employing, for example, a circuit configuration such that resonation elements of the RF-VCOs 13-1 and 13-2 resonate at different frequencies, the carrier frequency of each RF-VCO may be changed without superimposing the reference voltage Vref1 or Vref2 on f(t). The reference voltages Vref1 and Vref2 may be provided for controlling a bias point of the RF-VCOs 13-1 and 13-2.

In the example illustrated in FIG. 1, the probe signals P1 and P2 generated by the signal generator 10 are respectively amplified by a corresponding power amplifier (PWA) and are simultaneously radiated via the transmitting antennas $A_{T1}$ and $A_{T2}$ to a detection region.

Each of the receiving antennas $A_{R1}$ to $A_{RN}$ simultaneously receives echo signals generated from reflection of P1 and P2 from a target. The signals received by the receiving antennas $A_{R1}$ to $A_{RN}$ will be referred to as echo signals E1 to EN, respectively. In the present embodiment, for simplicity, the transmitting antennas $A_{T1}$ and $A_{T2}$ and the receiving antennas $A_{R1}$ to $A_{RN}$ are aligned on a straight line, $A_{R1}$ to $A_{RN}$ are positioned between $A_{T1}$ and $A_{T2}$, and $A_{R1}$ to $A_{RN}$ are arranged at equally-spaced intervals.

Since P1 and P2 are simultaneously radiated to the detection region, each of the echo signals E1 to EN contains a reflected wave of P1 and that of P2. Assume that the echo signals E1 to EN contain a reflected wave from at least one target.

The echo signals E1 to EN received at $A_{R1}$ to $A_{RN}$ are guided to the demodulators 20-1 to 20-N after being amplified by a low-noise amplifier (LNA) corresponding to each antenna.

The demodulators 20-1 to 20-N correspond to the respective receiving antennas $A_{R1}$ to $A_{RN}$, and, using at least one of the probe signals P1 and P2 generated by the signal generator 10, the circuits 20-1 to 20-N respectively generate two sets of data signals from the corresponding echo signals E1 to EN.

The configurations and the operations of the demodulators 20-1 to 20-N are substantially the same with each other. That is, each of the demodulators 20-1 to 20-N includes a divider (DIV) 21, mixers 22-1 and 22-2, and a filter circuit 23. In the following, using the demodulator 20-1 as an example, an operation sequence in which the echo signal E1 received at $A_{R1}$ is demodulated will be described.

The divider 21 divides the echo signal E1 and guides echo signals that are substantially the same with each other to the mixers 22-1 and 22-2 configured with, for example, analog multipliers.

The mixer 22-1 multiplies E1 by P1 output from the signal generator 10. As a result, the output from the mixer 22-1 is a baseband component E11 of E1, that is down-converted by the probe signal P1, (a signal obtained via similar operations will be hereinafter referred to as a demodulated echo signal).

Similarly, the mixer 22-2 multiplies E1 by P2 output from the signal generator 10. As a result, the output from the mixer 22-2 is a baseband component E12 of E1, that is down-converted by the probe signal P2.

The filter circuit 23 includes low pass filters (LPFs) 23-1 and 23-2 that respectively filter output signals of the mixers 22-1 and 22-2. The LPF 23-1 generates a data signal D11 by extracting a corresponding frequency component from the demodulated echo signal E11 output from the mixer 22-1. Similarly, the LPF 23-2 generates a data signal D12 by extracting a corresponding frequency component from the demodulated echo signal E12 output from the mixer 22-2. Note that "Dnm" represents a reflected-wave component of the m-th probe signal extracted from an echo signal received via the n-th receiving antenna.

Figures 3A, 3B, 3C:
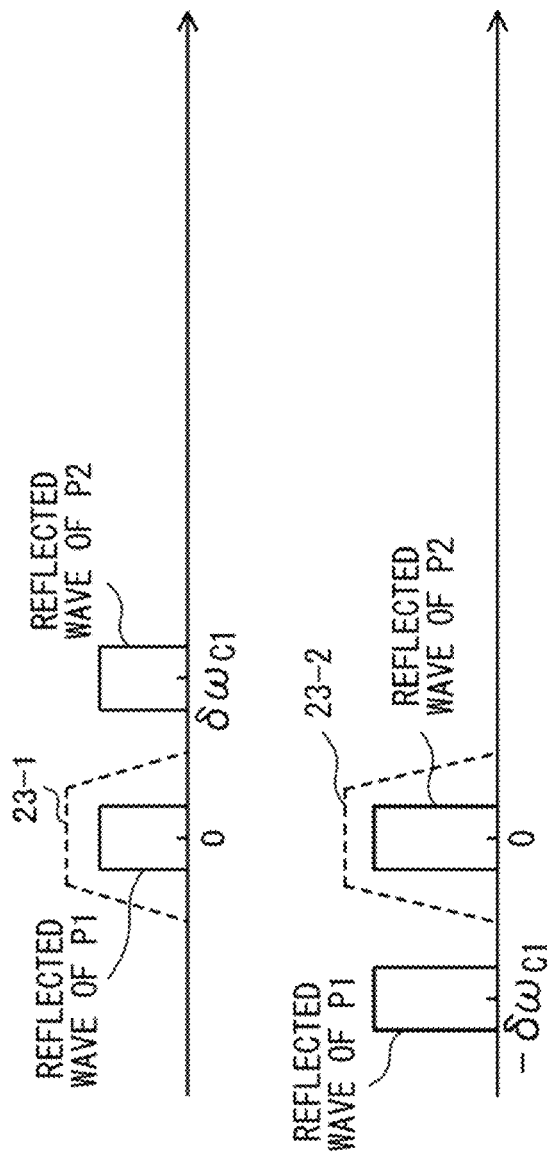
FIG. 3A to FIG. 3C illustrate operations of a demodulator in accordance with the first embodiment.

FIG. 3A to FIG. 3C illustrate operations of the demodulator 20-1. In this example, as indicated in FIG. 3A, the detection and ranging system 1 transmits a probe signal P1 with a carrier frequency $\omega_{c1}$ and a probe signal P2 with a carrier frequency $\omega_{c2}$. In the following descriptions, the difference between the carrier frequency $\omega_{c1}$ and the carrier frequency $\omega_{c2}$ will be referred to as "$\delta\omega$" (or "$\delta\omega_{c1}$").

Here, an echo signal E1 is input to the demodulator 20-1 via the receiving antenna $A_{R1}$, and E1 contains reflected waves of the probe signals P1 and P2. Accordingly, when E1 is illustrated in a frequency domain, the spectrums of the reflected waves originating from P1 and P2 may be represented on a frequency axis as indicated in FIG. 3A.

FIG. 3B illustrates operations of the mixer 22-1 and the LPF 23-1. As described above, the mixer 22-1 multiplies E1 by P1 with the carrier frequency $\omega_{c1}$. Multiplying E1 by P1 down-converts E1 by $\omega_{c1}$, and hence the reflected-wave component of P1 contained in E1 is obtained in a baseband region (as E11 described above). Meanwhile, the reflected-wave component of P2 contained in E1 is obtained in a region shifted from the baseband region by $\delta\omega$.

The cutoff frequency of the LPF 23-1 is set to pass the reflected-wave component of P1 and block the reflected-wave component of P2, so the LPF 23-1 blocks the reflected-wave component of P2 and transmits the reflected-wave component of P1. The frequency component extracted by the LPF 23-1 corresponds to the aforementioned data signal D11.

FIG. 3C illustrates operations of the mixer 22-2 and the LPF 23-2. As described above, the mixer 22-2 multiplies E1 by P2 with the carrier frequency $\omega_{c2}$. Multiplying E1 by P2 down-converts E1 by $\omega_{c2}$, and hence the reflected-wave component of P2 contained in E1 is obtained in the baseband region (as E12 described above). Meanwhile, the reflected-wave component of P1 contained in E1 is obtained in a region shifted from the baseband region by $\delta\omega$.

The cutoff frequency of the LPF 23-2 is set to pass the reflected-wave component of P2 and block the reflected-wave component of P1, so the LPF 23-2 blocks the reflected-wave component of P1 and transmits the reflected-wave component of P2. The frequency component extracted by the LPF 23-2 corresponds to the aforementioned data signal D12.

In regard to the allocation of the LPF outputs on the frequency axis in FIG. 3B and FIG. 3C, the relative position may be determined according to the carrier frequencies of P1 and P2.

In this way, the filter circuit 23 of the demodulator 20-1 separates a reflected-wave component of P1 and a reflected-wave component of P2 from E1 received via $A_{R1}$ and outputs these components. That is, the demodulator 20-1 generates two sets of data signals D11 and D12 from one set of echo signals E1 received via $A_{R1}$.

Operations of the demodulators 20-1 to 20-N are similar to each other, and hence the demodulators 20-1 to 20-N generate 2N (M×N; M=2 in this example) sets of data signals. That is, the reflected-wave component of P1 contained in received signals received by $A_{R1}$ to $A_{RN}$ and the reflected-wave component of P2 contained in the received signals received at $A_{R1}$ to $A_{RN}$ are obtained simultaneously.

The data signals output from the demodulators 20-1 to 20-N are converted into digital signals by A/D converters 42, respectively. The digital signals obtained via the A/D converters 42 are provided to the signal processor 30. M×N×Q pieces of data are actually processed, where Q is the number of data sampled from the time domain signal having the fundamental period of Tm; here, for simplicity, a sampling in the time domain is not detailed.

The signal processor 30 includes a processor and/or a hardware circuit for digital computation. In accordance with 2N sets (generally, M×N sets; M=2 in this example) of digitalized data signals, the signal processor 30 estimates the distance from the detection and ranging system 1 to a target, the speed of the target relative to the detection and ranging system 1, and the angle formed with the target.

Using at least one data signal, the signal processor 30 estimates the distance and the speed of the target relative to the detection and ranging system 1. In this case, the signal processor 30 applies, for example, FFT to the data signal in a time domain obtained for each of the up-chirp section and the down-chirp section of f(t) so as to convert the data signal into a data signal in a frequency domain. When the modulation input signal assumes, for example, a saw-tooth wave shape, target positioning is done by calculating autocorrelation of the data signal in the time domain, and hence the data signal does not necessarily need to be converted into a signal in the frequency domain by using FFT. Modifications of a circuit configuration corresponding to a modulation scheme employed by the detection and ranging system will not be described in detail hereinafter.

In accordance with a peak frequency obtained in the up-chirp section and a peak frequency obtained in the down-chirp section, the signal processor 30 estimates the distance and the speed of the target relative to the detection and ranging system 1. The method to detect the target using the peak frequencies will not be described herein since the method may be realized by known art.

The signal processor 30 may estimate the direction to the target by applying a well-known direction-of-arrival estimation (or target angle estimation; the term "direction-of-arrival estimation" and the term "target angle estimation" will not be particularly distinguished hereinafter) method to a plurality of data signals.

The direction-of-arrival estimation method does not limit the present invention, and a DBF (digital beam forming) method, MUSIC (multiple signal classification) algorithm, a PRISM (propagator method based on an improved spatial-smoothing matrix) algorithm, and an ESPRIT (estimation of signal parameters via rotational invariance techniques) algorithm, and so forth, are known as direction-of-arrival estimation methods.

As described above, the detection and ranging system in accordance with the first embodiment simultaneously transmits probe signals each with a different carrier frequency from the transmitting antennas and obtains echo signals via the receiving antennas. Then, by filtering echo signals with frequency filters (e.g., LPFs), reflected-wave components originating from the probe signals are extracted from each echo signal. That is, M×N sets of different reflected-wave components are obtained. Accordingly, in the simplest case, the physical aperture of a receiving array antenna of the detection and ranging system is effectively enlarged by M times, so the detection performance or the detection accuracy is improved. When consideration is made for structures including a function for achieving a phase matching operation, as with the TSS synthetic aperture, the effective aperture is enlarged by M times or smaller. M represents the number of actual transmitting antennas and N represents the number of actual receiving antennas.

In, for example, a configuration in which probe signals with the same carrier frequency are transmitted from transmitting antennas (comparative example 1), it is difficult to separate reflected-wave components of a plurality of probe signals contained in echo signals from each other. Accordingly, in comparative example 1, it is necessary to adopt the time division multiplexing wherein at least Tm is assigned as a time interval during which a probe signal is radiated from each transmitting antenna. As a result, it takes a long time to detect a target.

By contrast, in the case of the detection and ranging system 1 in accordance with the first embodiment, reflected-wave components of a plurality of probe signals contained in echo signals are separated from each other by the frequency filters. That is, separated reflected-wave components of a plurality of probe signals can be obtained within 1 (one) Tm (the simultaneous transmission/simultaneous reception allows the transmission time to be extended for another purpose, such as SNR improvement). Accordingly, in comparison with the comparative example 1, the detection and ranging system 1 in accordance with the first embodiment takes a short time period to detect a target.

To resolve the disadvantage of the comparative example 1, a configuration has been proposed in which a probe signal of each transmitting antenna is spread by a different code (comparative example 2). However, the comparative example 2 needs, for example, a circuit for dispreading the received signal for each receiving antenna. Accordingly, the circuit size increases, and this is in opposition to the cost reduction required by the market.

By contrast, in the detection and ranging system 1 in accordance with the first embodiment, reflected-wave components of a plurality of probe signals contained in echo signals are separated from each other by simple circuit elements, frequency filters. Accordingly, in comparison with the comparative example 2, the detection and ranging system 1 in accordance with the first embodiment may include a simplified circuit only and be achieved at a low cost.

Next, operations of the detection and ranging system 1 in accordance with the first embodiment will be described mathematically. In the following, assume that the detection and ranging system 1 includes M transmitting antennas and N receiving antennas.

The signal generator 10 generates probe signals by inputting a modulation input signal f(t) to each of the RF-VCOs, each with a different carrier frequency, $\omega_{cm}$ (m=1 to M).

The detection and ranging system simultaneously transmits the plurality of probe signals to a detection region. A probe signal $v_m^{TX}$ transmitted from a transmitting antenna m (m=1 to M) is represented by formula (1). The superscript "TX" in formula (1) indicates a transmitted signal. Formula (2) indicates a phase term of an FMCW signal obtained by integrating a modulation input signal, and an instantaneous frequency of $v_m^{TX}$ is $\omega_{cm}$+f(t). In the following descriptions, for ease of explanation, the influence of propagation characteristics and imperfections in the system and so on will be ignored.

$$v_m^{TX}(t) = \exp\{j[\omega_{cm} t + h(t)]\} \quad (1)$$

$$h(t) = \int_{-\infty}^{t} f(x) dx \quad (2)$$

When there are K targets in the detection region of the system, a target echo signal $v_n^{RX}$ received by a receiving antenna n (n=1 to N) is represented by formula (3). The superscript "RX" in formula (3) indicates a received signal.

$$v_n^{RX}(t) = \quad (3)$$
$$\sum_{k=1}^{K} \sum_{m=1}^{M} \exp\{j[\omega_{cm}(t-\tau_k) + \omega_d^{m,k}(t-\tau_k/2) + h(t-\tau_k) + \phi_n^{m,k}]\} + n_n(t)$$

$$\phi_n^{m,k} = \frac{2\pi d}{\lambda_m}(n-1)\sin\theta_k \quad (4)$$

Figure 4:
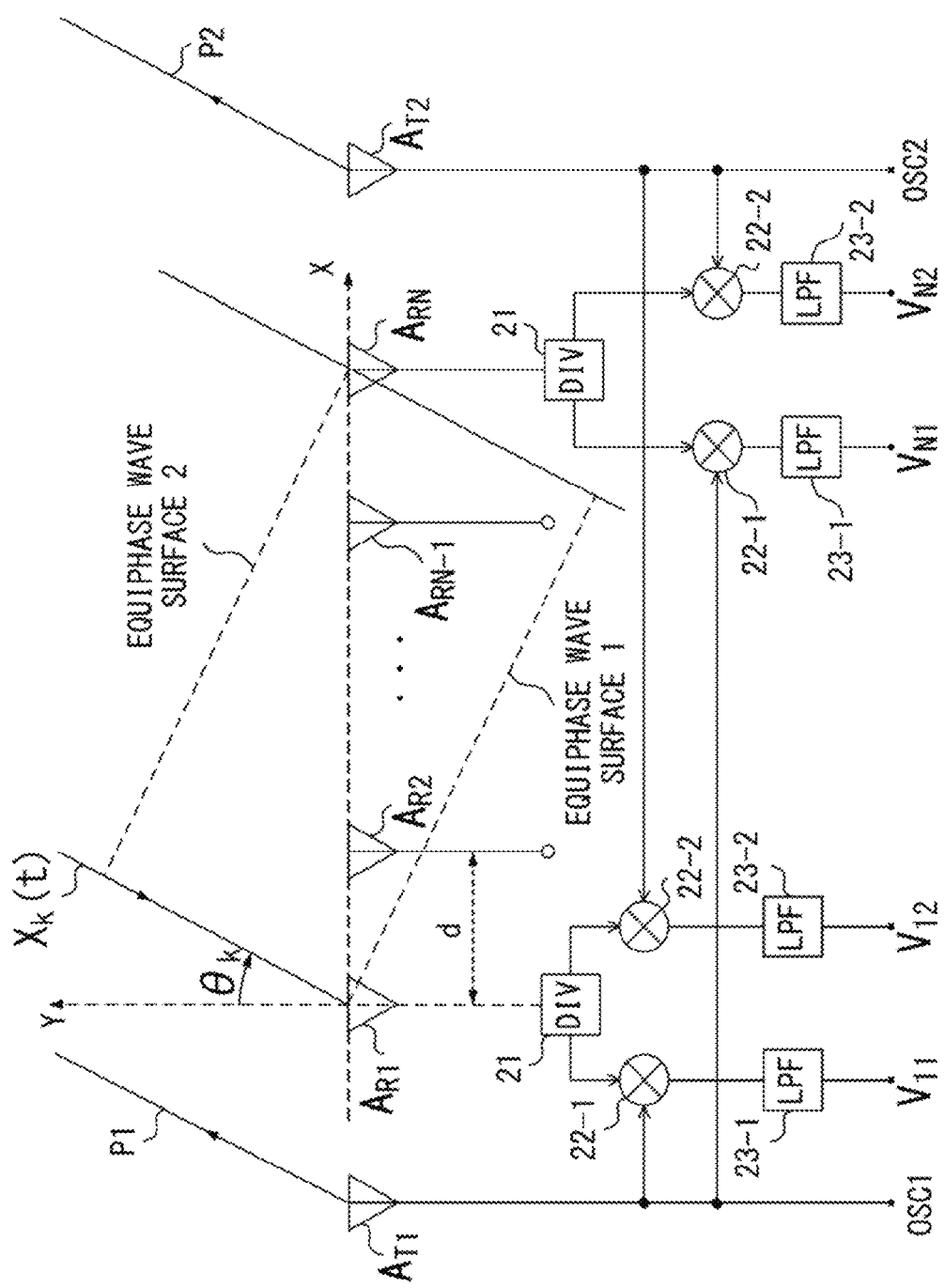
FIG. 4 illustrates a spatial phase of an echo signal.

Formulae (3) and (4) will be described with reference to FIG. 4. The detection and ranging system in FIG. 4 includes two transmitting antennas (M=2). Assume that, in FIG. 4, the position of the receiving antenna $A_{R1}$ is defined as the origin of the X-Y coordinate, and the transmitting antennas $A_{T1}$ and $A_{T2}$ and the receiving antennas $A_{R1}$ to $A_{RN}$ are located on the X-axis. In addition, the receiving antennas $A_{R1}$ to $A_{RN}$ are arranged in this order on the positive X axis at equal spacing d, and the Y-axis is defined as 0 degrees and the clockwise direction is defined as the positive direction of the angle.

A target k (k=1 to K) at the position corresponding to distance $d_k$ and angle $\theta_k$ is moving at speed $v_k$.

The time period from when a probe signal is radiated from the detection and ranging system to when the signal returns to the system after reflected from the target k (delay time $\tau_k$) is represented as $2d_k/c_0$, and a Doppler frequency $\omega_d^{m,k}$ with respect to the speed of the target is represented as $2\omega_{cm} v_k/c_0$. $c_0$ represents the speed of light.

An echo signal from the target k arrives at a receiving array antenna including $A_{R1}$ to $A_{RN}$ as a plane wave from the direction corresponding to angle $\theta_k$, and hence, when the receiving antenna $A_{R1}$ is defined as a reference, the difference between the propagation distance from the target k to $A_{R1}$ and the propagation distance to the n-th receiving antenna is $d(n-1)\sin\theta_k$. In other words, when $A_{R1}$ is defined as the zero reference of the spatial phase, spatial phase $\phi_n^{m,k}$ with respect to the m-th carrier of an echo signal obtained by the n-th receiving antenna is defined by formula (4). $\lambda_m$ indicates the wavelength of the m-th carrier.

The demodulators 20-1 to 20-N corresponding to $A_{R1}$ to $A_{RN}$ demodulate the received echo signal using an l-th TX signal (or probe signal). The TX signal is represented by formula (1), the received echo signal is represented by formula (3), and $n_n(t)$ in formula (3) indicates an AWGN.

The demodulation is achieved by multiplying the received echo signal by the TX signal. That is, the received echo signal is demodulated according to the following formula (5). The superscript "BB" indicate a baseband component. The asterisk mark "*" represents a complex conjugate.

$$v_{n,l}^{BB}(t) = v_n^{RX*}(t) v_l^{TX}(t) \quad (5)$$

$$= \left( \sum_{k=1}^{K} \sum_{m=1}^{M} \exp\left\{ j \left[ \begin{array}{c} \omega_{cm}(t-\tau_k) + \omega_d^{m,k}(t-\tau_k/2) + \\ h(t-\tau_k) + \phi_n^{m,k} \end{array} \right] \right\} + n_n(t) \right)^* \times$$
$$\exp\{j[\omega_{cl} t + h(t)]\}$$

$$= \sum_{k=1}^{K} \sum_{m=1}^{M} \exp\left\{ j \left[ \begin{array}{c} (\omega_{cl} - \omega_{cm})t + \omega_{cm}\tau_k - \omega_d^{m,k}(t-\tau_k/2) + \\ h(t) - h(t-\tau_k) - \phi_n^{m,k} \end{array} \right] \right\} +$$
$$n_n^*(t) \exp\{j[\omega_{cl} t + h(t)]\}$$

-continued $$\cong \sum_{k=1}^{K}\sum_{m=1}^{M} \alpha_{m,k} x_k(t) \exp[j(\delta\omega_{cm}^l - \omega_d^{m,k})t]\exp(-j\phi_n^{m,k}) + n_n(t)$$

Formula (5) uses notations defined by the following formulae (6.1) to (6.3). Formula (6.1) indicates the difference between the carrier frequency of an l-th TX signal and the carrier frequency of an m-th TX signal. The difference frequency may be hereinafter referred to as a subcarrier (the difference frequency is 0 when l=m, but this is also considered as a special case).

$$\delta\omega_{cm}^l = \omega_{cl} - \omega_{cm} \quad (6.1)$$

$$x_k(t) = \exp\{j[h(t) - h(t-\tau_k)]\} \quad (6.2)$$

$$\alpha_{m,k} = \exp[j(\omega_{cm} + \omega_d^{m,k}/2)\tau_k] \quad (6.3)$$

In the meantime, in accordance with the detection and ranging system that simultaneously transmits TX signals with M different carrier frequencies, M subcarriers are provided for each receiving antenna. Accordingly, the detection and ranging system in accordance with the embodiment of the invention includes M frequency filters (or LPFs or BPFs) for each receiving antenna, thereby separating and obtaining, from each receiving antenna, a baseband component of a reflected wave originating from M sets of probe signals. In the configuration illustrated in FIG. 1 (Embodiment 1), since M=2, the detection and ranging system 1 includes LPFs 23-1 and 23-2.

Next, to sift the analyses to more detailed stages, the characteristic of the LPF is defined by formula (7). For simplicity, phase characteristics and the like are ignored in formula (7). If the case of the LPF is analyzed, it is possible to similarly address the situation in which the filter is replaced with, for example, a BPF.

$$G(\omega) = \begin{cases} 1; & |\omega| < \max[X_m(\omega)] = \Omega; \text{ for } \forall m \in [1, M] \\ 0; & \text{else} \end{cases} \quad (7)$$

An impulse response of formula (7) is represented by formula (8). $\Omega$ corresponds to a cutoff frequency of the LPF.

$$g(z) = \frac{1}{2\pi}\int_{-\infty}^{\infty} G(\omega)\exp(j\omega z)d\omega = \frac{\Omega}{2\pi}\mathrm{sinc}(\Omega z/2) \quad (8)$$

An output signal of the LPF is represented by formula (9).

$$v_{n,l}^{BB}(t) = \int_{-\infty}^{\infty} g(z) v_{n,l}^{BB}(t-z) dz = \text{Signal} + \text{Noise} \quad (9)$$

The modulation input signal f(t) is a periodic function with respect to time, and hence, in consideration of $x_k(t) = x_k(t-z)$, formula (10) is obtained from formula (9). In the expansion from formula (9) to formula (10), noise components are of little relevance to the dominant signal processing, so they are ignored.

$$\sum_{k=1}^{K}\sum_{m=1}^{M}\left\{\frac{\alpha_{m,k}}{M}\int_{-\infty}^{\infty} g(z) x_k(t-z)\exp[j(\delta\omega_{cm}^l - \omega_d^{m,k})(t-z)]dz\right\} \quad (10)$$

$$\exp(-j\phi_n^{m,k}) =$$

$$\sum_{k=1}^{K}\sum_{m=1}^{M}\frac{\alpha_{m,k}}{2\pi M}\left\{\int_{-\infty}^{\infty} \Omega\mathrm{sinc}[\Omega z/2]\exp[j(\delta\omega_{cm}^l - \omega_d^{m,k})(t-z)]dz\right\}$$

$$x_k(t)\exp(-j\phi_n^{m,k}) =$$

$$\sum_{k=1}^{K}\sum_{m=1}^{M}\frac{\alpha_{m,k}}{2\pi M}\left\{\int_{-\infty}^{\infty} \Omega\mathrm{sinc}[\Omega z/2]\exp[-j(\delta\omega_{cm}^l - \omega_d^{m,k})z]dz\right\}$$

$$x_k(t)\exp[j(\delta\omega_{cm}^l - \omega_d^{m,k})t] \times \exp(-j\phi_n^{m,k}) =$$

$$\sum_{k=1}^{K}\sum_{m=1}^{M}\frac{\alpha_{m,k}}{2\pi M}\mathrm{rect}\left[\frac{\delta\omega_{cm}^l - \omega_d^{m,k}}{\Omega/2}\right]x_k(t)$$

$$\exp[j(\delta\omega_{cm}^l - \omega_d^{m,k})t]\exp(-j\phi_n^{m,k})$$

In formula (10), "rect" indicates a rectangular function representing a filtering effect of the LPF. When decomposing the signal component represented by formula (10) into the term for "m=l" and the term for "m≠l", an output signal of the LPF is represented by formula (11). As described above, successive operations from demodulation to this decomposition are performed by the mixer and the filter. Here, assume that each of the levels of signals output from the divider 21 is simply attenuated by the divider 21 to 1/M the level of the input signal. Meanwhile, in formula (11), noise $n_n(t)$ is indicated again.

$$v_{n,l}^{BB}(t) \cong \sum_{k=1}^{K}\frac{\alpha_{l,k}}{\pi M}\mathrm{rect}\left[\frac{-\omega_d^{l,k}}{\Omega/2}\right]x_k(t)\exp(-j\omega_d^{l,k}t)\exp(-j\phi_n^{l,k}) + \quad (11)$$

$$\sum_{k=1}^{K}\sum_{\substack{m=1 \\ m\neq l}}^{M}\frac{\alpha_{m,k}}{\pi M}\mathrm{rect}\left[\frac{\delta\omega_{cm}^l - \omega_d^{m,k}}{\Omega/2}\right]x_k(t)$$

$$\exp[j(\delta\omega_{cm}^l - \omega_d^{m,k})t]\exp(-j\phi_n^{m,k}) + n_n(t)$$

In formula (11), the first term of the right hand side corresponds to a component desired to be extracted using the LPF. Here, as indicated by formula (6.2), $x_k$ depends on time delay $\tau_k$ due to the distance from the detection and ranging system to the target k, and Doppler frequency $\omega_d^{m,k}$ depends on the carrier frequency and the speed of the target. As indicated in formula (4), $\omega_n^{m,k}$ depends on angle $\theta_k$ formed with the target k (, and of course depends on the wavelength of the carrier).

The second term of the right hand side of formula (11) corresponds to a component blocked by the LPF. As indicated by formula (6.1), $\delta\omega_{cm}^l$ indicates the difference between the carrier frequencies. Accordingly, when a contribution of the second term is sufficiently small in comparison with the first term, an intended frequency component is extracted from the echo signal. In this case, as an example, determining the cutoff frequency of the LPF appropriately for the frequency difference between carriers for which the Doppler frequency is considered makes sufficiently small the second term of the right hand side of formula (11).

As an example, the detection and ranging system 1 which uses two different carriers (M=2) obtains signals illustrated in FIG. 3A to FIG. 3C. Here, when demodulation is performed by the probe signal P1, the component of the first term of formula (11) appears at the position of P1 on the frequency axis in FIG. 3B. That is, the component that passes through the LPF 23-1 corresponds to a reflected-wave of P1 and the component that is blocked by the LPF 23-1 corresponds to a reflected wave of P2.

Similarly, when demodulation is performed by the probe signal P2, the component of the first term of formula (11) appears at the position of P2 on the frequency axis in FIG. 3C. That is, the component that passes through the LPF 23-2 corresponds to a reflected wave of P2 and the component that is blocked by the LPF 23-2 corresponds to a reflected wave of P1.

In the detection and ranging system 1, in consideration of a variation in bands due to the Doppler frequency, a carrier frequency of each probe signal is determined to prevent passbands of corresponding LPFs from interfering with each other after demodulation. Accordingly, M sets of N-dimensional signal vectors may be generated simultaneously from physically existing N receiving antennas.

In the meantime, "$x_k(t)\exp(-j\omega_d^{1,k}t)$" in the first term on the right hand side of formula (11) is a baseband component obtained by a general detection and ranging system. Accordingly, "$x_k(t)\exp(-j\omega_d^{1,k}t)$", more precisely, factor $(_{1,k}/(M))\text{rect}(-\omega_d^{1,k}/(/2))$ is also taken into consideration" will hereinafter simply be represented as "$x_k(t)$". As a result, a signal vector obtained by the detection and ranging system 1 illustrated in FIG. 1 is represented by the following formula (12).

$$v(t) = \begin{bmatrix} v_1^{BB}(t) \\ v_2^{BB}(t) \end{bmatrix} = \begin{bmatrix} A_1 \\ A_2 \end{bmatrix} x(t) + n(t) \quad (12)$$

Signal vectors $v_1^{BB}$ and $v_2^{BB}$ are defined in formula (13.1), and each of these vectors includes N components, each of which is represented by formula (11). A baseband signal component $x(t)$ is a K-dimensional vector defined in formula (13.2). $n(t)$ is an M×N dimensional noise signal vector.

$$v_1^{BB}(t) = [v_{1,1}^{BB}(t), \ldots, v_{N,1}^{BB}(t)]^T \\ v_2^{BB}(t) = [v_{1,2}^{BB}(t), \ldots, v_{N,2}^{BB}(t)]^T \quad (13.1)$$

$$x(t) = [x_1(t), \ldots, x_K(t)]^T \quad (13.2)$$

In addition, formula (14) defines an angle matrix $A_m$.

$$A_m = \begin{bmatrix} 1 & \cdots & 1 \\ \vdots & \ddots & \vdots \\ \exp(-j\phi_N^{m,1}) & & \exp(-j\phi_N^{m,K}) \end{bmatrix} \quad (14)$$

Figure 2:
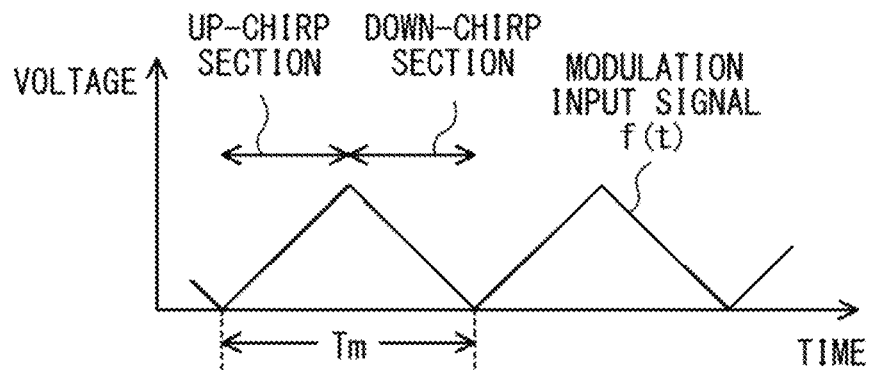
FIG. 2 illustrates an example of a modulation input signal.

Accordingly, the detection and ranging system 1 generates, during, for example, cycle Tm of the modulation input signal f(t) illustrated in FIG. 2, an M×N dimensional data vector (matrix) that enables aperture synthesis. Angle estimation of a target using the M×N dimensional data vector (matrix) is achieved by a known algorithm as described above.

An angle matrix A of formula (14) depends on the carrier frequency of a probe signal, and hence, in order to achieve proper aperture synthesis, it is usually preferable that the difference between carrier frequencies of probe signals be small. Meanwhile, the difference between carrier frequencies of probe signals needs to be determined such that echo signals can be separated by the LPF (or BPF) after demodulation. However, since the bandwidth occupied by the baseband signal of the radar after the demodulation process is about several hundred kHz at most, when, for example, carrier frequencies are 76 GHz or 79 GHz, the difference between the carrier frequencies may be decreased to a few MHz.

Second Embodiment

Figure 5:
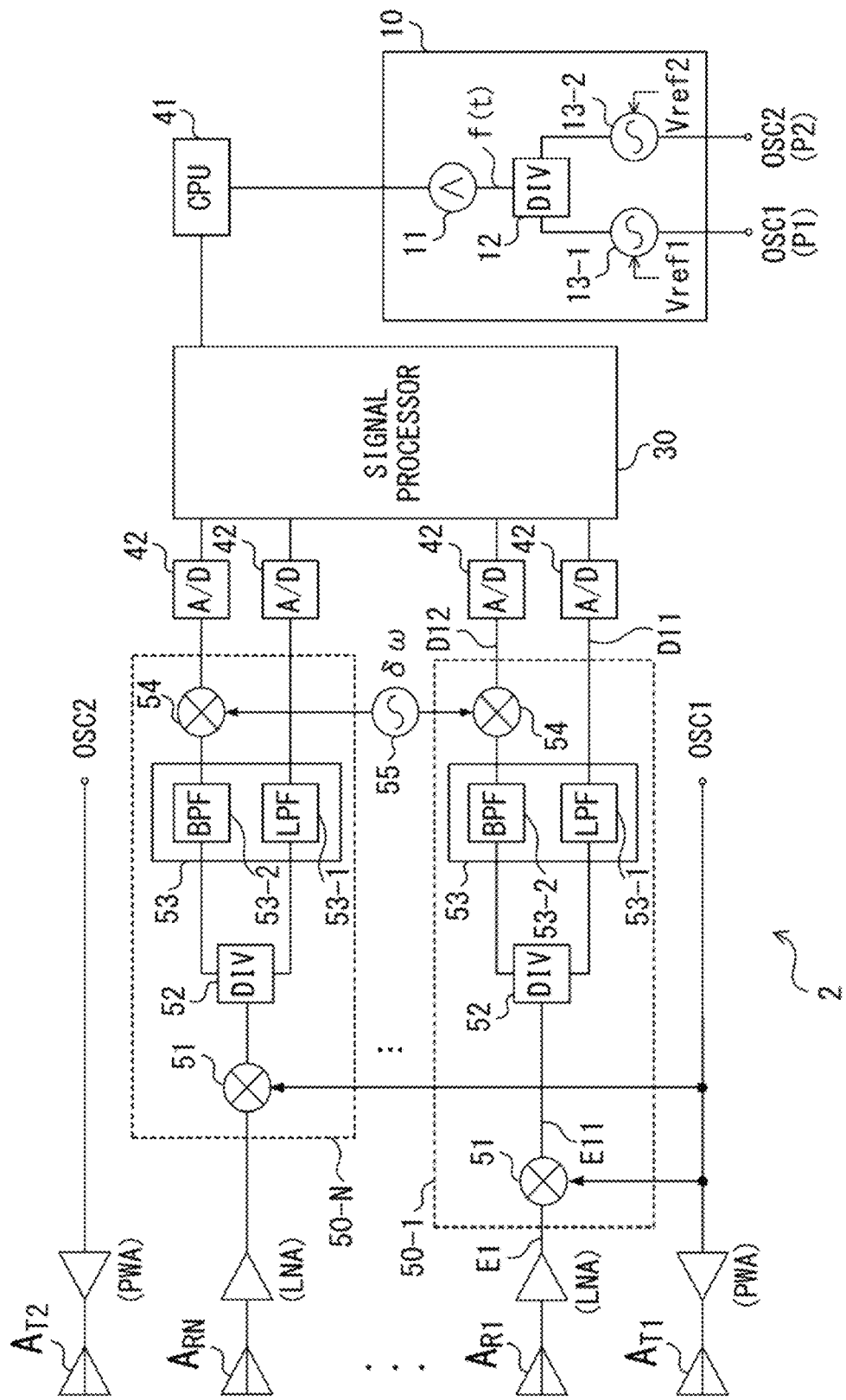
FIG. 5 illustrates the configuration of a detection and ranging system in accordance with a second embodiment.

FIG. 5 illustrates the configuration of a detection and ranging system in accordance with a second embodiment of the present invention (hereinafter referred to as a "detection and ranging system 2"). The detection and ranging system 2 includes a signal generator 10, transmitting antennas $A_{T1}$ and $A_{T2}$, receiving antennas $A_{R1}$ to $A_{RN}$, demodulators 50-1 to 50-N, a signal processor 30, and a CPU 41. The signal generator 10, $A_{T1}$ and $A_{T2}$, $A_{R1}$ to $A_{RN}$, the signal processor 30, and the CPU 41 are substantially the same as those in the first embodiment. However, configurations and operations of the demodulators 50-1 to 50-N are different from those of the demodulators 20-1 to 20-N in the first embodiment.

Each of the demodulators 20-1 to 20-N in the first embodiment demodulates an echo signal using a plurality of probe signals. By contrast, each of the demodulators 50-1 to 50-N in the second embodiment includes a mixer 51, a divider 52, a filter circuit 53, and a mixer 54, and demodulates an echo signal using one probe signal. The filter circuit 53 includes a low pass filter (LPF) 53-1 and a band pass filter (BPF) 53-2. In the following, operations of the demodulator 50-1 that demodulates an echo signal E1 received by the receiving antenna $A_{R1}$ will be described as an example.

The mixer 51 multiplies E1 by any one of a plurality of probe signals. In this example, E1 is multiplied by a probe signal P1 to generate a demodulated echo signal E11. The mixer 51 is, for example, an analog multiplier.

The demodulated echo signal E11 is divided by the divider 52 and fed to the LPF 53-1 and the BPF 53-2.

Referring to FIG. 3B, the LPF 53-1 generates a data signal D11 by extracting a corresponding frequency component from E11. Meanwhile, since the BPF 53-2 extracts a corresponding frequency component from E11, the mixer 54 generates a data signal D12 by multiplying the output of the BPF 53-2 by a subcarrier signal generated from a subcarrier generator 55. The mixer 54 is, for example, an analog multiplier.

The subcarrier generator 55 generates a subcarrier signal having carrier-frequency-difference frequency &o for a probe signal P1 having carrier frequency $\omega_{c1}$ and a probe signal P2 having carrier frequency $\omega_{c2}$. The subcarrier generator 55 provides the generated subcarrier signal to the mixer 54.

FIG. 6A to FIG. 6C illustrate operations of the demodulator 50-1. As indicated in FIG. 6A, the detection and ranging system 2 transmits P1 and P2 simultaneously similar to that in the first embodiment illustrated in FIG. 3A. The difference between carrier frequency $\omega_{c1}$ and carrier frequency $\omega_{c2}$ will be hereinafter represented as "δω".

As is the case in the first embodiment, E1 is input to the demodulator 50-1 via $A_{R1}$. That is, E1 contains reflected waves of P1 and P2. Accordingly, the components of E1 on the frequency domain is presented in FIG. 6A.

FIG. 6B illustrates operations of the mixer 51, the LPF 53-1, and the BPF 53-2. As described above, the mixer 51 multiplies E1 by P1. Here, the carrier frequency of P1 is $\omega_{c1}$, and hence, as a result of the mixer operation, E1 is down-converted by frequency $\omega_{c1}$. Accordingly, the reflected-wave component of P1 contained in E1 is obtained in a baseband region. Meanwhile, the reflected-wave component of P2 contained in E1 is obtained in a region shifted from the baseband region by subcarrier frequency $\delta\omega$.

The cutoff frequency of the LPF 53-1 is set to pass the reflected-wave component of P1 and block the reflected-wave component of P2, so only the data signal D11 representing the reflected-wave component of P1 is output from the LPF 53-1.

Meanwhile, the passband of the BPF 53-2 is set to pass the reflected-wave component of P2 and block components in other bands, so only the reflected-wave component of P2 is output from the BPF 53-2.

FIG. 6C illustrates operations of the mixer 54. As described above, the mixer 54 multiplies the output of the BPF 53-2 by the subcarrier signal. Here, since the frequency of the subcarrier signal is $\delta\omega$, the output signal of the BPF 53-2 is converted into the baseband region by the mixer 54 and the data signal D12 representing the reflected-wave component of P2 is extracted.

In this way, the demodulator 50-1 separates the reflected-wave component of P1 and the reflected-wave component of P2 from E1 received via $A_{R1}$ and outputs these components. In other words, the demodulator 50-1 generates two sets of data signals D11 and D12 from E1 received via $A_{R1}$.

The configurations and operations of the demodulators 50-1 to 50-N are similar to each other, and hence, as is the case with the first embodiment, 2N sets of data signals are generated by the demodulators 50-1 to 50-N. As an example, an output signal (or the data signal D11) of the LPF 53-1 of the demodulator 50-1 is represented by formula (15).

$$v_{1,1}^{BB}(t) \cong \sum_{k=1}^{K} \frac{\alpha_{1,k}}{\pi M} \mathrm{rect}\left[\frac{-\omega_d^{1,k}}{\Omega/2}\right] x_k(t)\exp\left(-j\phi_1^{1,k}\right) + n_1(t) \qquad (15)$$

An output signal (or a data signal DN2) of the mixer 54 of the demodulator 50-N is represented by formula (16). In formula (16), $\delta\omega$ is replaced by $\delta\omega_{c1}^2$ according to the notation used in formula (11).

$$v_{N,2}^{BB}(t)\exp(-j\delta\omega_{c1}^2 t) \cong \sum_{k=1}^{K} \frac{\alpha_{2,k}}{\pi M} \mathrm{rect}\left[\frac{-\omega_d^{2,k}}{\Omega/2}\right] x_k(t)\exp\left(-j\phi_N^{2,k}\right) + n_N(t) \qquad (16)$$

As in the case of the first embodiment, the signal processor 30 uses 2N sets of data signals to estimate the distance and the speed of the target relative to the detection and ranging system 2, and the direction to the target.

The detection and ranging system 2 in accordance with the second embodiment is not limited to the configuration illustrated in FIG. 5, and various variations are possible. As an example, in the configuration illustrated in FIG. 5, the mixer 54 is provided on the output side of the BPF 53-2, but the BPF 53-2 may be replaced with the LPF 53-2 and the mixer 54 may be provided on the input side of the LPF 53-2.

Third Embodiment

Figure 7:
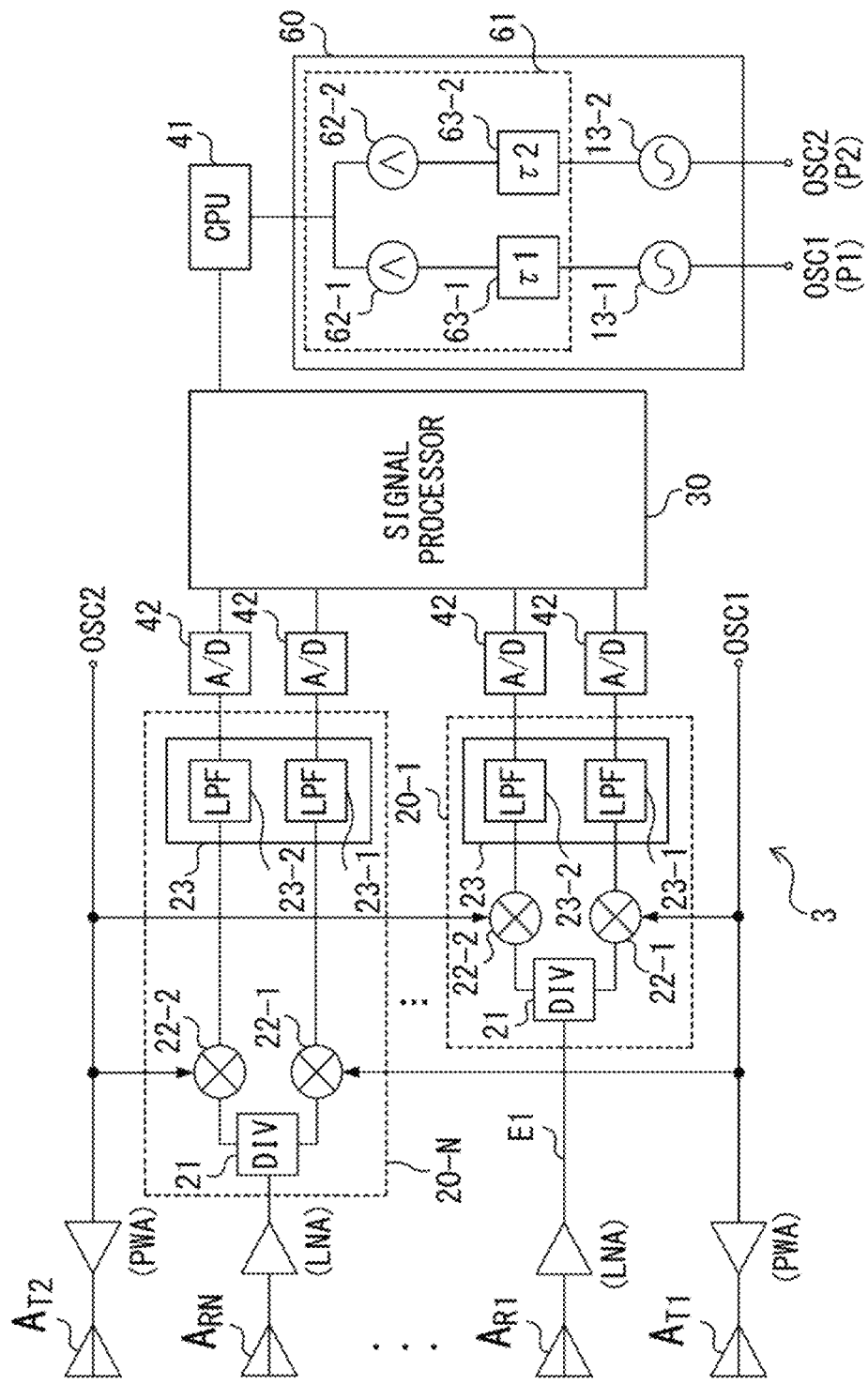
FIG. 7 illustrates the configuration of a detection and ranging system in accordance with a third embodiment.

FIG. 7 illustrates the configuration of a detection and ranging system in accordance with a third embodiment (hereinafter referred to as a "detection and ranging system 3"). The detection and ranging system 3 in accordance with the third embodiment includes a signal generator 60, transmitting antennas $A_{T1}$ and $A_{T2}$, receiving antennas $A_{R1}$ to $A_{RN}$, demodulators 20-1 to 20-N, a signal processor 30, and a CPU 41. The antennas $A_{T1}$ and $A_{T2}$ and $A_{R1}$ to $A_{RN}$, the demodulators 20-1 to 20-N, the signal processor 30, and the CPU 41 in FIG. 7 are substantially the same as those in the first embodiment. However, the configuration and operations of the signal generator 60 are different from those of the signal generator 10 in accordance with the first embodiment. That is, the signal generator 60 includes BB-OSCs 62-1 and 62-2 and delay elements 63-1 and 63-2, and outputs of the delay elements 63-1 and 63-2 are fed to RF-VCOs 13-1 and 13-2.

Each of the BB-OSCs 62-1 and 62-2 generates a cyclic modulation input signal including an up-chirp section and a down-chirp section as illustrated in, for example, FIG. 2. Here, the BB-OSCs 62-1 and 62-2 may generate modulation input signals each having parameters such as waveform, amplitude, and cycle that are different from those of the other modulation input signals (if phase is also included in the parameters, the subsequent delay elements 63-1 and 63-2 may be omitted). Note that the BB-OSCs 62-1 and 62-2 may generate the same modulation input signal.

The delay elements 63-1 and 63-2 delay output signals from the BB-OSCs 62-1 and 62-2, respectively. That is, the delay element 63-1 delays the output signal from the BB-OSC 62-1 by $\tau 1$. Similarly, the delay element 63-2 delays the output signal from the BB-OSC 62-2 by $\tau 2$. In accordance with the characteristics of the output signals from the BB-OSCs, $\tau 1$ and $\tau 2$ may be identical with each other or may be different from each other. Alternatively, $\tau 1$ and $\tau 2$ may be zero.

As in the case of the first embodiment, control terminals of the RF-VCOs 13-1 and 13-2 are provided with reference voltages Vref1 and Vref2, for setting carrier frequencies, on which the modulation input signals f1(t) and f2(t) generated by the BB-OSCs 62-1 and 62-2 and respectively delayed by $\tau 1$ and $\tau 2$ by the delay elements 63-1 and 63-2. As a result, the RF-VCO 13-1 outputs a frequency modulated signal (or probe signal) P1 having an instantaneous frequency that is centered around the carrier frequency set by the Vref1 and changed by f1(t). Meanwhile, the RF-VCO 13-2 outputs a frequency modulated signal (or probe signal) P2 having an instantaneous frequency that is centered around the carrier frequency set by the Vref2 and changed by f2(t). Note that the OSC 1 is obtained by the BB-OSC 62-1, the delay element 63-1, and the RF-VCO 13-1, and the OSC 2 is obtained by the BB-OSC 62-2, the delay element 63-2, and the RF-VCO 13-2.

As described above, in the third embodiment, not only carrier frequencies of a plurality of probe signals are different from each other but also at least one parameter (e.g., modulation cycle or phase) of a probe signal from among the plurality of probe signals is different from that of the other probe signals. Therefore, in comparison with the first embodiment, the third embodiment may further reduce interference between probe signals.

Figure 8A:
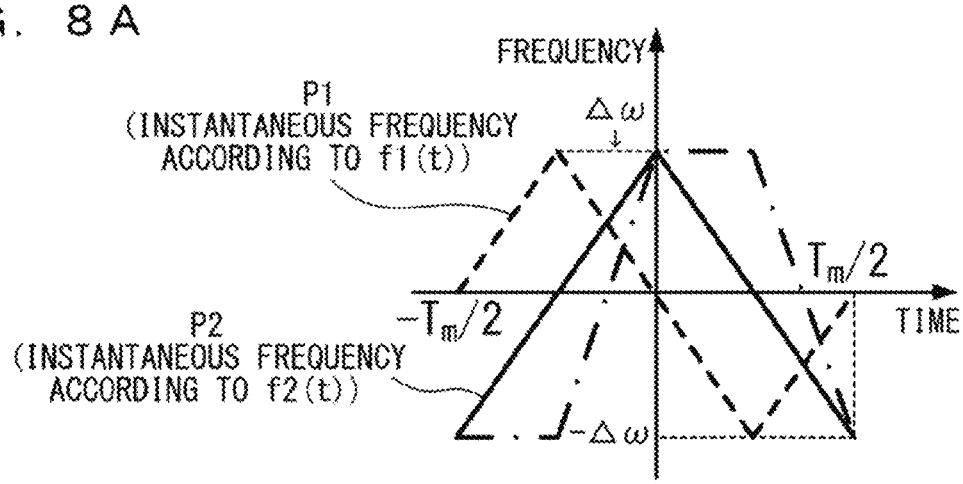
FIG. 8A and FIG. 8B illustrate exemplary operations of the third embodiment.
Figure 8B:
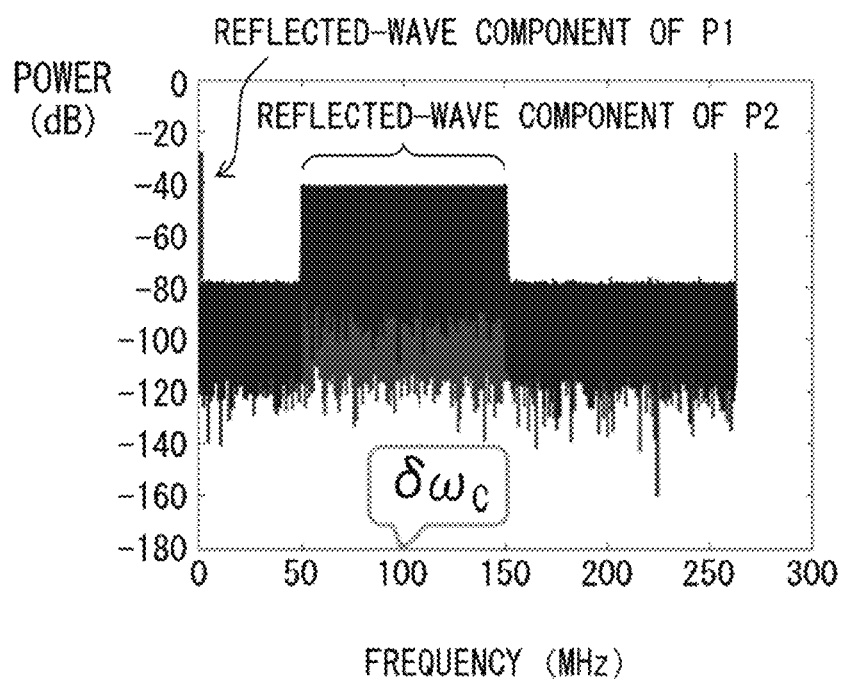

FIG. 8A and FIG. 8B illustrate exemplary operations of the third embodiment. FIG. 8A indicates temporal changes in the instantaneous frequencies (that is, difference of carrier frequencies is ignored) of P1 and P2. This indicates that the waveforms, the amplitudes, and the cycles of signals output from the BB-OSCs 62-1 and 62-2 are identical with each other and the delay elements 63-1 and 63-2 are adjusted so as to be $\tau 1=Tm/2$ and $\tau 2=0$. In this case, the phase of the signal f1(t) input to the control terminal of the RF-VCO 13-1 lags $\pi/2$ behind the signal f2(t) input to the control terminal of the RF-VCO 13-2. That is, the modulation phase of P1 lags $\pi/2$ behind the modulation phase of P2. The long and short dashed line represents the difference between instantaneous frequencies that is made when a reflected wave of P2 is demodulated by P1.

FIG. 8B illustrates a simulation result of an output signal of the mixer 22-1 in the demodulator illustrated in FIG. 7. That is, the spectrum of a signal obtained by multiplying a received echo signal by P1 is illustrated. The difference $\delta\omega_c$ between the carrier frequencies of P1 and P2 is 100 MHz such that the allocation of the signals on the frequency axis can be easily identified.

Under these conditions, the reflected-wave component of P1 is obtained in the baseband frequency and the reflected-wave component of P2 is obtained in the frequency range from 50 MHz to 150 MHz. Here, the spectrum of the reflected-wave component of P1 is separated from the spectrum of the reflected-wave component of P2 by about 50 MHz, and hence, using an LPF having a proper cutoff frequency, the reflected-wave component of P2 may be blocked while only the reflected-wave component of P1 is extracted. In this simulation, the power of the reflected-wave component of P2 is lower than the power of the reflected-wave component of P1 by about 10 dBm. This is because the demodulation of the reflected-wave component of P2 by P1 changes the instantaneous frequency of P2 after the demodulation into the trapezoidal wave shape as illustrated in FIG. 8A, which spreads the spectrum.

The detection and ranging system 3 in accordance with the third embodiment is not limited to the configuration illustrated in FIG. 7 and may be modified in various ways. For example, when the cycles of modulation input signals for generating P1 and P2 are identical with each other, a signal generated by one modulation signal generator may be divided and guided to the delay elements 63-1 and 63-2.

Fourth Embodiment

In the first to third embodiments, the detection and ranging system includes two transmitting antennas. However, the present invention is not limited to this configuration. That is, the detection and ranging system may include more than two transmitting antennas.

Figure 9:
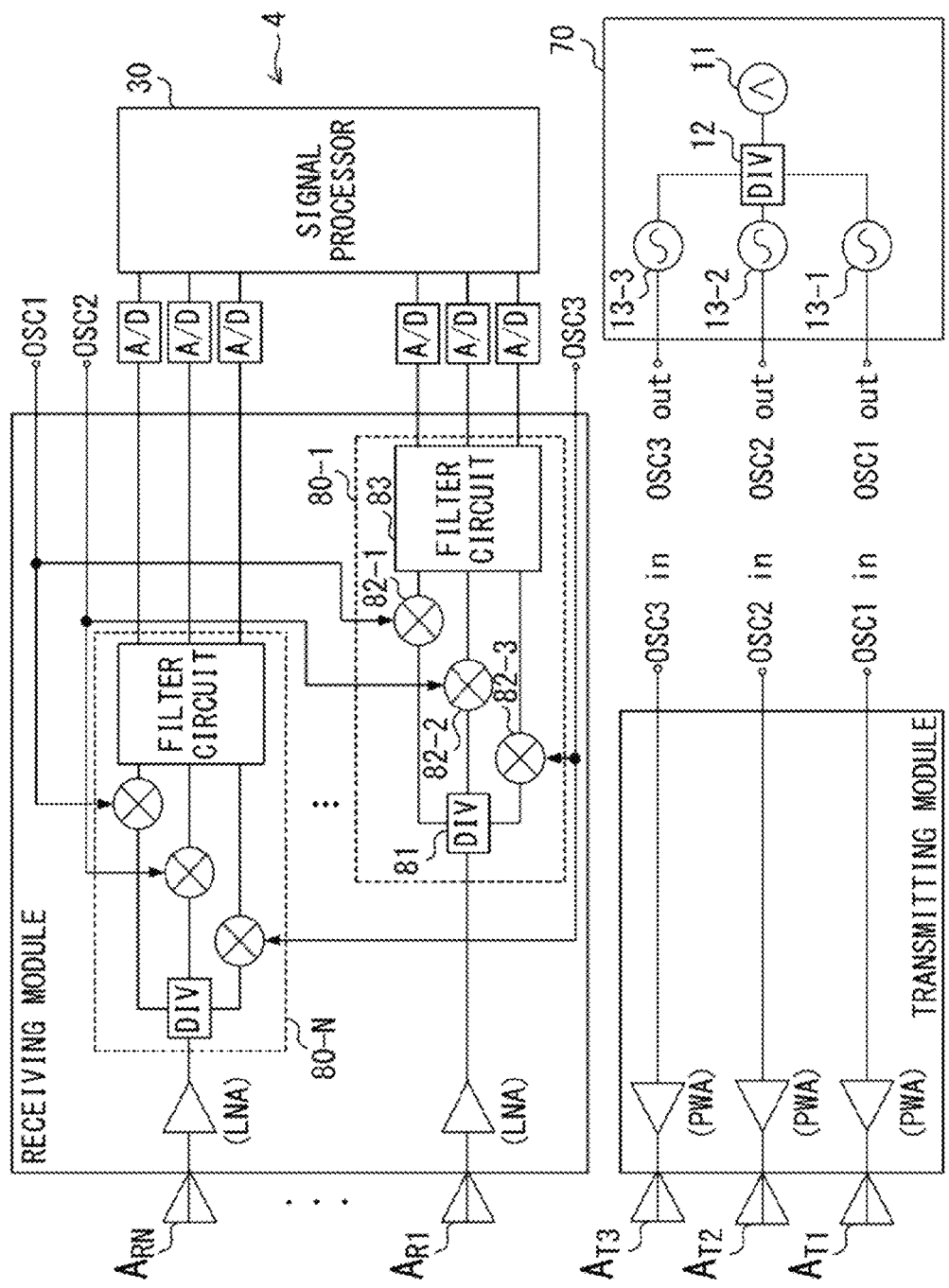
FIG. 9 illustrates the configuration of a detection and ranging system in accordance with a fourth embodiment.

FIG. 9 illustrates the configuration of a detection and ranging system in accordance with a fourth embodiment (hereinafter referred to as a "detection and ranging system 4"). The detection and ranging system 4 in accordance with the fourth embodiment includes a signal generator 70, transmitting antennas $A_{T1}$ to $A_{T3}$, receiving antennas $A_{R1}$ to $A_{RN}$, demodulators 80-1 to 80-N, a signal processor 30, and a CPU 41 (for simplicity, CPU is not shown on this figure). That is, the detection and ranging system 4 includes three transmitting antennas.

The configuration and operations of the signal generator 70 are similar to those of the signal generator 10 in accordance with the first embodiment. However, to generate three probe signals P1 to P3 with a different carrier frequencies, the signal generator 70 includes a modulation input signal generator (BB-OSC) 11, a divider 12, and RF-VCOs 13-1 to 13-3.

Reference voltages Vref1 to Vref3, for setting carrier frequencies, on which f(t) divided by the divider 12 has been superimposed are fed to control terminals of the RF-VCOs 13-1 to 13-3. Oscillators OSCs 1 to 3 (configured with the BB-OSC 11, the divider 12, and the RF-VCOs 13-1 to 13-3) generate three probe signals P1 to P3 with different carrier frequencies.

In this example, $A_{T1}$ to $A_{T3}$ are positioned outside of the one end of $A_{R1}$ to $A_{RN}$, and $A_{T1}$ to $A_{T3}$ and $A_{R1}$ to $A_{RN}$ are aligned on a straight line. $A_{T1}$ to $A_{T3}$ simultaneously transmit, to a detection region, P1 to P3 generated by the signal generator 70, respectively.

Echo signals received by $A_{R1}$ to $A_{RN}$ are respectively guided to the demodulators 80-1 to 80-N corresponding to the antennas. The configurations and operations of the demodulators 80-1 to 80-N are similar to those of the demodulators 20-1 to 20-N in accordance with the first embodiment. However, to separate reflected-wave components of P1, P2 and P3 from each other, each of the demodulators 80-1 to 80-N includes a divider 81, mixers 82-1 to 82-3, and a filter circuit 83.

The mixers 82-1 to 82-3 respectively multiply P1 to P3 by a received echo signal distributed from the divider 81. The output signal of each of the mixers 82-1 to 82-3 passes through the filter circuit 83 configured with three LPFs. In this way, three sets of data signals are generated from echo signals received via a receiving antenna.

The processes performed by the signal processor 30 are substantially the same as the processes performed by the signal processor 30 in the first embodiment. In the fourth embodiment, however, using 3×N sets of data signals, the distance and the speed of the target relative to the detecting and ranging system 4, and the direction to the target are estimated.

Fifth Embodiment

In the fifth embodiment, the carrier frequency (or center frequency) of each probe signal is not always constant with respect to the time but changes for each assigned time slot (the width may be optional for each slot). In, for example, the configuration illustrated in FIG. 1, the carrier frequency of each probe signal is controlled in accordance with the reference voltages Vref1 and Vref2 applied to the RF-VCOs 13-1 and 13-2. Thus, changing Vref1 and Vref2 for each time slot generates probe signals P1 and P2 whose carrier frequencies change with time. In this case, the signal generator 10 may include, for example, a reference voltage control circuit (not illustrated). Alternatively, each reference voltage may be generated in accordance with an instruction from the CPU 41.

Superimposing f(t) output from the BB-OSC 11 on each of the reference voltages Vref1 and Vref2 that change with time as described above allows each probe signal to include the up-chirp section and the down-chirp section illustrated in FIG. 2. However, the carrier frequency of each probe signal changes with time as described above and, in addition, the phase lacks continuity if a proper correction is not made at the time of carrier switching, and hence S/N may be degraded. f(t)=0 makes this example equivalent to a system that uses a multifrequency CW signal as a probe signal.

Figure 10:
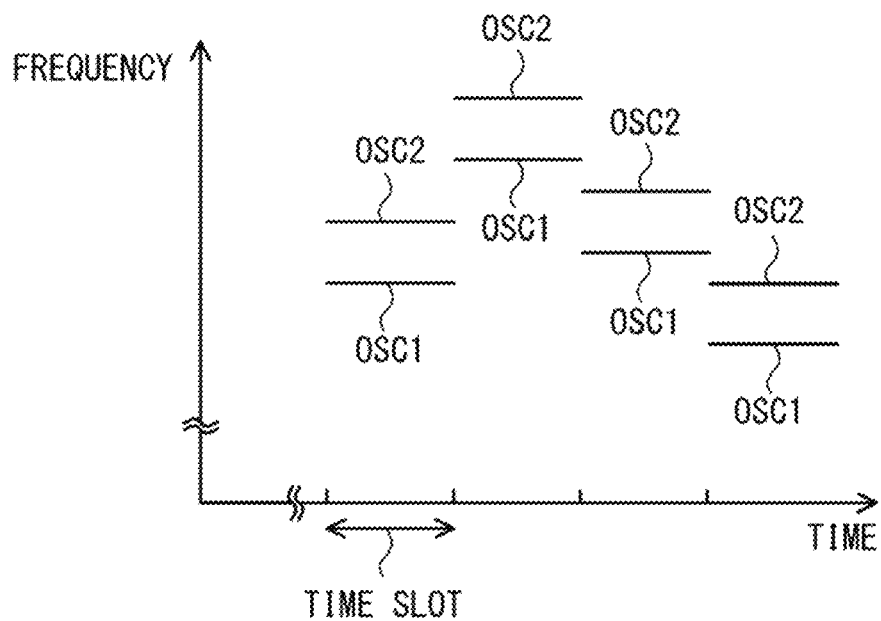
FIG. 10 illustrates a method for generating a probe signal in accordance with a fifth embodiment (Carrier frequencies of probe signals are hopping by time slot).

FIG. 10 illustrates carrier frequencies of probe signals with respect to time in the fifth embodiment. In the example illustrated in FIG. 10, the carrier frequency of each probe signal changes by time slots. A period of the time slot is not limited to a specific length but may be, for example, whole-number multiple of Tm (the cycle of f(t) in FIG. 2). Causing the carrier frequency of each probe signal to, for example, change randomly or pseudo-randomly will make this example equivalent to a system that uses a frequency-hopping spread spectrum signal as a probe signal. In this case, the minimum step of the frequency change corresponds to, for example, the bandwidth needed to achieve a value required for a detection and ranging function (e.g., distance resolution).

Sixth Embodiment

For each of a plurality of targets within a detection region, the detection and ranging system estimates the distance and the speed of the target relative to the detection and ranging system, and the direction to the target. Here, increasing the number of targets to be detected will increase, in particular, the amount of computation for direction estimation (i.e., estimation of angular information) by the signal processor 30.

As a result, when, for example, the capability of the signal processor 30 is not high, it is sometimes difficult to estimate angular information for all targets in real time.

Accordingly, in the sixth embodiment, priorities are given to a plurality of targets within a detection region, and angular information is estimated for the targets starting from the target with the highest priority. A specific priority may be determined based on, for example, distance information on the distance from the detection and ranging system to the target (obtained using, for example, a range gate), speed information of the target (indicating whether the target is approaching or going away from the detection and ranging system or indicating the speed (obtained using, for example, a Doppler gate)), or the amount of the distance information and the speed information combined with each other using an specified function (for example, Japanese Laid-open Patent Publication No. 2009-243947).

When priorities are simply determined based on distance, a high priority is given to a target close to the detection and ranging system and a low priority is given to a target far from the detection and ranging system.

The distance from the detection and ranging system to a target is calculated by, for example, detecting a peak of the spectrum of an echo signal converted into the baseband. Here, assume that a target T1 is positioned close to the detection and ranging system and a target T2 is positioned far from the detection and ranging system. In this case, as illustrated in FIG. 11A, one set of peaks corresponding to the target T1 are detected at ±ω1 close to frequency 0. One set of peaks corresponding to the target T2 are detected at ±ω2 that are further from frequency 0 than ±ω1.

As a result, using, for example, an LPF 91 illustrated in FIG. 11A, a signal component representing the target T1 can be extracted. Similarly, using a BPF 92, a signal component representing the target T2 can be extracted. That is, appropriately filtering echo signals that have been converted into the baseband allows a plurality of targets within a detection region to be grouped in accordance with the distances from the detection and ranging system.

FIG. 11B illustrates a circuit that achieves a function for grouping a plurality of targets in accordance with the distances from the detection and ranging system. Here, a configuration will be described in which the targets are grouped in accordance with an echo signal received by a receiving antenna $A_{R1}$.

A divider 21 distributes the received echo signal to mixers 22-1 and 22-2. The mixers 22-1 and 22-2 respectively multiply the input received echo signals by probe signals P1 and P2 (see the descriptions of the operations of the first embodiment).

An output signal from the mixer 22-1 is guided to an LPF 91-1 and a BPF 92-1 by a divider 93. The LPF 91-1 corresponds to the LPF 91 having the cutoff frequency illustrated in FIG. 11A, and the LPF 91-1 extracts a target whose distance from the detection and ranging system is less than a specified threshold (hereinafter referred to as a "short-distance target"). Accordingly, an output signal $V_{11a}$ of the LPF 91-1 is a reflected-wave component of P1 from the short-distance target. Meanwhile, the BPF 92 corresponds to the BPF 92 having the passband illustrated in FIG. 11A, and the BPF 92-1 extracts a target whose distance from the detection and ranging system is greater than or equal to the specified threshold (hereinafter referred to as a "long-distance target"). That is, an output signal $V_{11b}$ of the BPF 92-1 is a reflected-wave component of P1 from the long-distance target.

The operations of the LPF 91-2 and the BPF 92-2 that filter an output signal of the mixer 22-2 are substantially the same as those of the LPF 91-1 and the BPF 92-1. Therefore, an output signal $V_{12a}$ of the LPF 91-2 represents the reflected-wave component of P2 from the short-distance target, and an output signal $V_{12b}$ of the BPF 92-2 represents the reflected-wave component of P2 from the long-distance target.

The configurations and operations of demodulators provided at output side of the receiving antennas $A_{R1}$ to $A_{RN}$ are substantially identical with each other. That is, in the sixth embodiment, 2N sets of signals $V_{11a}$ to $V_{N2a}$ associated with the short-distance target and 2N sets of signals $V_{11b}$ to $V_{N2b}$ associated with the long-distance target are generated.

In a variation of the operation of the signal processor 30, angular information may be estimated for each computation cycle by using signals $V_{11a}$ to $V_{N2a}$, and, when there is sufficient time for computation judging from a thread level of a target, signals $V_{11b}$ to $V_{N2b}$ may be additionally used to estimate the angular information. Alternatively, the signal processor 30 may perform angular information estimation using signals $V_{11a}$ to $V_{N2a}$ for each computation cycle and may perform angular information estimation using signals $V_{11b}$ to $V_{N2b}$ only once in a plurality of computation cycles.

In accordance with the sixth embodiment, even when the capability of the signal processor 30 is insufficient, angular information for at least a short-distance target may be obtained without fail. Accordingly, when the detection and ranging system is installed in, for example, a vehicle, important targets can be detected without fail.

As long as there is no discrepancy, the first to sixth embodiments may be combined in any manner. As an example, in the descriptions above, the third embodiment (i.e., the system in which the phase and the cycle of a modulation input signal are different for each probe signal) is shown as one of extensions of the first embodiment, but the third embodiment may be applied to the second or fourth embodiment. The fifth embodiment (i.e., the system in which each carrier frequency changes with time) is applicable to any of the first to fourth embodiments. The sixth embodiment (i.e., the system in which targets are grouped with respect to distance) is also applicable to any of the first to fourth embodiments.

Seventh Embodiment

The direction to a target is described by an angular matrix (or azimuth matrix) defined by formula (14). However, as indicated in formula (4), element φ contained in the angular matrix depends on the carrier frequency (represented as a wavelength in formula (4)) of a probe signal. In other words, when differences are large between the carrier frequencies of probe signals, a different angular matrix is generated for each of the probe signals.

In the seventh embodiment, using this property, reliability or consistency of angle estimation is calculated. However, when a difference between angular matrixes generated for a probe signal is sufficiently large in comparison with angular resolution, there is a risk of reducing accuracy in angle estimation performed via aperture synthesis. Accordingly, in the seventh embodiment, as a general rule, aperture synthesis is not performed.

The configuration of the detection and ranging system in accordance with the seventh embodiment may be substantially the same as those of the aforementioned embodiments (e.g., the first embodiment). In the seventh embodiment, however, the difference $\delta\omega$ between the carrier frequency $\omega_{c1}$ of the probe signal P1 and the carrier frequency $\omega_{c2}$ of the probe signal P2 is greater than a specified threshold that achieves signal separation performed by filtering. Processes performed by the signal processor 30 are different from those performed in the first to sixth embodiments.

FIG. 12 is a flowchart indicating a process of calculating the reliability of an estimated angle. The process indicated by the flowchart is executed by the signal processor 30.

In S1, the signal processor 30 performs first angle estimation according to a reflected-wave component of the probe signal P1. As an example, in the configuration illustrated in FIG. 1, signals representing reflected-wave components of P1 are obtained by the LPFs 23-1 of each of the demodulators 20-1 to 20-N. The signal processor 30 may estimate, for example, angle $\theta_{k1}$ formed with a target k (k=1 to K).

In S2, the signal processor 30 performs second angle estimation according to a reflected-wave component of the probe signal P2. In the configuration illustrated in FIG. 1, signals representing reflected-wave components of P2 are obtained by the LPFs 23-2 of each of the demodulators 20-1 to 20-N. In this case, the signal processor 30 may estimate, for example, angle $\theta_{k2}$ formed with the target k (k=1 to K).

In S3, the signal processor 30 calculates the reliability of the angle estimation according to the results of the first and second angle estimations. As an example, when estimation results of $\theta_{k1}$ and $\theta_{k2}$ are obtained in S1 and S2 as the angles formed with the target k, the signal processor 30 calculates a distance D, between $\theta_{k1}$ and $\theta_{k2}$ for each target by using, for example, the following formula.

$$D_k = |\theta_{k1} - \theta_{k2}|^2$$

When the distance D is small, consistency in the estimation performed using P1 and P2 is considered to be high. Accordingly, the signal processor 30 calculates, for example, the average or the minimum of $D_k$ obtained for each target, and decides the reliability of an estimated angle in accordance with the average or the minimum value.

As described above, in the seventh embodiment, the reliability of an estimated angle can be evaluated using a plurality of probe signals with different frequencies. The aforementioned embodiment indicates a configuration in which two probe signals are used, but the present invention is not limited to this. That is, the detection and ranging system in accordance with the seventh embodiment may use three or more transmitting antennas to transmit three or more probe signals.

As an example, when the detection and ranging system includes three transmitting antennas, aperture synthesis is performed using first and second probe signals, and reliability of angle estimation for the aperture synthesis may be evaluated using a third probe signal. In this case, it is preferable that the carrier frequencies of the first and second probe signals be separable via filtering and that these frequencies be close to each other to the extent that aperture synthesis is achieved.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A detection and ranging system comprising:
    a signal generator configured to generate M probe signals having different carrier frequencies, each of the probe signals being a radio frequency signal;
    M transmitting elements configured to transmit the M probe signals;
    N receiving elements configured to receive an echo signal from a target;
    N demodulators provided for the N receiving elements, each of the demodulators being configured to generate a demodulated echo signal by demodulating an echo signal received by a corresponding one of the receiving elements by using at least one of the M probe signals, and to generate M sets of data signals corresponding to the M probe signals by filtering the demodulated echo signal in a frequency domain; and
    a signal processor configured to detect the target according to M×N sets of data signals generated by the N demodulators, wherein
    each of the demodulators includes:
        a divider configured to divide the echo signal received by the corresponding one of the N receiving elements to generate M sets of echo signals;
        M mixers configured to generate M sets of demodulated echo signals by multiplying the M sets of echo signals output from the divider by the M probe signals; and
        a filter circuit configured to generate the M sets of data signals by extracting a corresponding frequency component from the M sets of demodulated echo signals output from the M mixers.

2. The detection and ranging system according to claim 1, wherein
    the filter circuit includes M low pass filters configured to extract corresponding frequency components from the M demodulated echo signals.

3. The detection and ranging system according to claim 1, wherein the signal generator includes:
    a modulation input signal generator configured to generate a modulation input signal; and
    M oscillators configured to oscillate at different frequencies, wherein
    the signal generator generates the M probe signals by providing the modulation input signal to the M oscillators.

4. The detection and ranging system according to claim 3, wherein
    the modulation input signal generator generates M modulation input signals in which at least one of a phase, an amplitude, and a cycle being different from each other, and
    the M modulation input signals are respectively provided to the M oscillators.

5. The detection and ranging system according to claim 3, wherein
    the modulation input signal generator generates M modulation input signals each indicating a different amplitude or a different cycle, and
    the M modulation input signals are respectively provided to the M oscillators.

6. The detection and ranging system according to claim 3, wherein
    carrier frequencies of the M probe signals generated by the M oscillators respectively change with respect to time.

7. The detection and ranging system according to claim 1, wherein each of the demodulators generates first to M-th data signals by extracting first to M-th frequency components from the demodulated echo signals generated by the M mixers, and the signal processor estimates a first angle formed with a target according to N sets of first data signals generated by the demodulators, and estimates an m-th (m=2 to M) angle formed with the target according to N sets of m-th data signals generated by the demodulators.

8. A detection and ranging system comprising:
a signal generator configured to generate M probe signals having different carrier frequencies, each of the probe signals being a radio frequency signal;
M transmitting elements configured to transmit the M probe signals;
N receiving elements configured to receive an echo signal from a target;
N demodulators provided for the N receiving elements, each of the demodulators being configured to generate a demodulated echo signal by demodulating an echo signal received by a corresponding one of the receiving elements by using at least one of the M probe signals, and to generate M sets of data signals corresponding to the M probe signals by filtering the demodulated echo signal in a frequency domain; and
a signal processor configured to detect the target according to M×N sets of data signals generated by the N demodulators, wherein
each of the demodulators includes:
 a first mixer configured to generate a demodulated echo signal by multiplying an echo signal received by the corresponding one of the receiving elements by a first probe signal among the M probe signals;
 a divider configured to divide the demodulated echo signal output from the first mixer to generate M sets of demodulated echo signals;
 a low pass filter configured to generate a data signal corresponding to the first probe signal by extracting a corresponding frequency component from the demodulated echo signal output from the divider;
 M-1 band pass filters, each of the M-1 band pass filters being configured to extract a corresponding frequency component from the demodulated echo signal output from the divider; and
 M-1 second mixers, each of the M-1 second mixers being configured to generate a data signal corresponding to one of the probe signals other than the first probe signal by multiplying a frequency component extracted by the corresponding band pass filter by a subcarrier signal having a difference frequency between the first probe signal and the corresponding probe signal.

9. A detection and ranging system comprising:
a signal generator configured to generate first to M-th probe signals having different carrier frequencies, each of the probe signals being a radio frequency signal;
first to M-th transmitting elements configured to respectively transmit the first to M-th probe signals;
a plurality of receiving elements configured to receive an echo signal from a target;
a plurality of demodulators provided for the plurality of receiving elements, each of the demodulators being configured to generate a demodulated echo signal by demodulating an echo signal received by a corresponding one of the receiving elements by using at least one of the first to M-th probe signals, and to generate first to M-th data signals corresponding to the first to M-th probe signals by filtering the demodulated echo signal in a frequency domain; and
a signal processor configured to perform a first angle estimation for the target according to a plurality of first data signals generated by the plurality of demodulators, to perform a second angle estimation for the target according to a plurality of m-th (m=2 to M) data signals generated by the plurality of demodulators, and to calculate a reliability of an angle estimated for the target based on a result of the first angle estimation and a result of the m-th angle estimation, wherein
each of the demodulators includes:
 a divider configured to divide the echo signal received by the corresponding one of the receiving elements to generate M sets of echo signals;
 M mixers configured to generate M sets of demodulated echo signals by multiplying the M sets of echo signals output from the divider by the M probe signals; and
 a filter circuit configured to generate the M sets of data signals by extracting a corresponding frequency component from the M sets of demodulated echo signals output from the M mixers.

10. A detection and ranging method comprising:
generating M probe signals having different carrier frequencies, each of the probe signals being a radio frequency signal;
transmitting the M probe signals using M transmitting elements;
receiving an echo signal from a target using N receiving elements;
dividing, for each echo signal received by the N receiving elements, the echo signal received by a corresponding one of the N receiving elements to obtain M sets of echo signals;
generating, for each echo signal received by the N receiving elements, M sets of demodulated echo signals by multiplying the M sets of echo signals by the M probe signals;
generating, for each demodulated echo signal, M sets of data signals corresponding to the M probe signals by extracting a corresponding frequency component from the M sets of demodulated echo signals with M different frequency filters; and
detecting the target according to M×N sets of data signals.

* * * * *